United States Patent [19]
Biesinger et al.

[11] Patent Number: 5,803,040
[45] Date of Patent: Sep. 8, 1998

[54] METHOD FOR SHUTTING DOWN AND RESTARTING INDIVIDUAL CYLINDERS OF AN ENGINE

[75] Inventors: Herwig Biesinger, Korntal-Münchingen; Heiko Flebbe, Sassenburg; Dieter Kalweit, Schorndorf; Peter Klein, Leinfelden-Echterdingen; Peter Lautenschütz, Plochingen; Anton Waltner, Weinstadt, all of Germany

[73] Assignee: Mercedes Benz AG, Germany

[21] Appl. No.: 764,390

[22] Filed: Dec. 13, 1996

[30] Foreign Application Priority Data

Dec. 13, 1995 [DE] Germany ............... 195 46 549.0

[51] Int. Cl.⁶ .................................................. F02B 77/00
[52] U.S. Cl. ................................... 123/198 F; 123/481
[58] Field of Search .......................... 123/198 F, 481, 123/90.15

[56] References Cited

U.S. PATENT DOCUMENTS

5,337,720  8/1994  Murakami et al. ............... 123/481
5,408,966  4/1995  Lipinski et al. ................. 123/198 F Primary Examiner—Noah P. Kamen
Attorney, Agent, or Firm—Evenson, McKeown, Edwards & Lenahan, P.L.L.C.

[57] ABSTRACT

The invention provides a method for shutting down and restarting individual cylinders of a multicylinder internal combustion engine by deactivating the charge change valves and the fuel injection. According to the invention, in shutting down a selected cylinder, the exhaust valve is disconnected first in all cases. Thereafter, the intake valve and fuel injection for the selected cylinder are controlled such that the last fuel injection into that cylinder takes place immediately before the last intake cycle. When a cylinder is restarted, the exhaust valve is always operated first, and only thereafter is the intake valve opened, with the first fuel injection always taking place immediately before the first intake cycle.

4 Claims, 7 Drawing Sheets

METHOD FOR SHUTTING DOWN AND RESTARTING INDIVIDUAL CYLINDERS OF AN ENGINE

BACKGROUND AND SUMMARY OF THE INVENTION

The invention relates to a method for shutting down and restarting individual cylinders of a multicylinder internal combustion engine.

A method for shutting down the cylinders of a multicylinder internal combustion engine is disclosed in U.S. Pat. No. 5,337,720, in which individual cylinders can be shut down or restarted by controlling the valve control and the fuel injection. When a cylinder is shut down, the corresponding fuel injection is deactivated first and the corresponding charge changing valves are deactivated after exactly one additional intake stroke and are held in the closed state as a result. When a cylinder is restarted, the charge change valves are activated first and the fuel injection is reactivated after exactly one additional intake stroke.

Undesired effects can occur in such cylinder shutdown processes. For example when a cylinder is shut down, the corresponding intake valve may be stopped before the exhaust valve. In this case, during the previous power stroke the exhaust is expelled from the cylinder but no fresh gas is drawn into the combustion chamber. Thus, undesired cooling takes place, compared to a shutdown in which hot exhaust is located in the combustion chamber. Another undesired event occurs when, although the exhaust valve is shut off first during shutdown, when this cylinder is restarted it is the intake valve that is activated first. Thus the combustion chamber is filled with hot exhaust during the shutdown phase, but upon restarting the fresh gas is mixed with the exhaust that remains in the combustion chamber, resulting in poorer combustion.

The object of the present invention is to provide a method for shutting down and restarting individual cylinders of an internal combustion engine in such fashion that cooling of the combustion chambers of the shutdown cylinders, and an adverse effect on the exhaust composition, can be prevented by the switching process.

This object is achieved by the method according to the invention, in which, when a cylinder is switched, the activation or deactivation of the intake and exhaust valves is controlled timewise in such fashion that the shutdown of the cylinder takes place after one intake stroke and the restart of the cylinder takes place before an intake stroke, thus ensuring that hot exhaust always remains in the shut down cylinder so that cooling of the combustion chamber is largely prevented. When the cylinder is restarted, this exhaust is first expelled out of the combustion chamber, and only then is a new air/fuel mixture drawn in. Thus, despite the cylinder's being shut down, assurance is provided that either definite combustion, or no combustion at all, takes place in the cylinder.

DETAILED DESCRIPTION OF THE DRAWINGS

Methods and devices are known for multicylinder internal combustion engines that make it possible to shut down one or more cylinders in certain operating ranges, for reasons of fuel economy for example. For this purpose, the charge change valves of the selected cylinders are preferably kept closed and fuel injection is interrupted. According to the embodiments described in greater detail below, the cylinder shutdown process takes place as a function of load and rpm, with only half of the cylinders being operated during the shutdown phase. In other words, a 6-cylinder internal combustion engine is operated on only three cylinders and an 8-cylinder internal combustion engine is operated on only four cylinders. However, the invention can also be used in the same way for shutting down individual cylinders.

Devices for activating and deactivating individual charge change valves are known from the prior art and will therefore be described only briefly in the following. (For example, a hydraulic device for coupling several valve actuating levers is known from an earlier patent application of the Applicant DE 42 21 135 C1.) Although the device described in that patent is used to couple two valve actuating levers operated by different cams of a camshaft, a coupling device of this kind according to the following designs can also be used to activate or deactivate a single valve-actuating lever.

Figure 1:
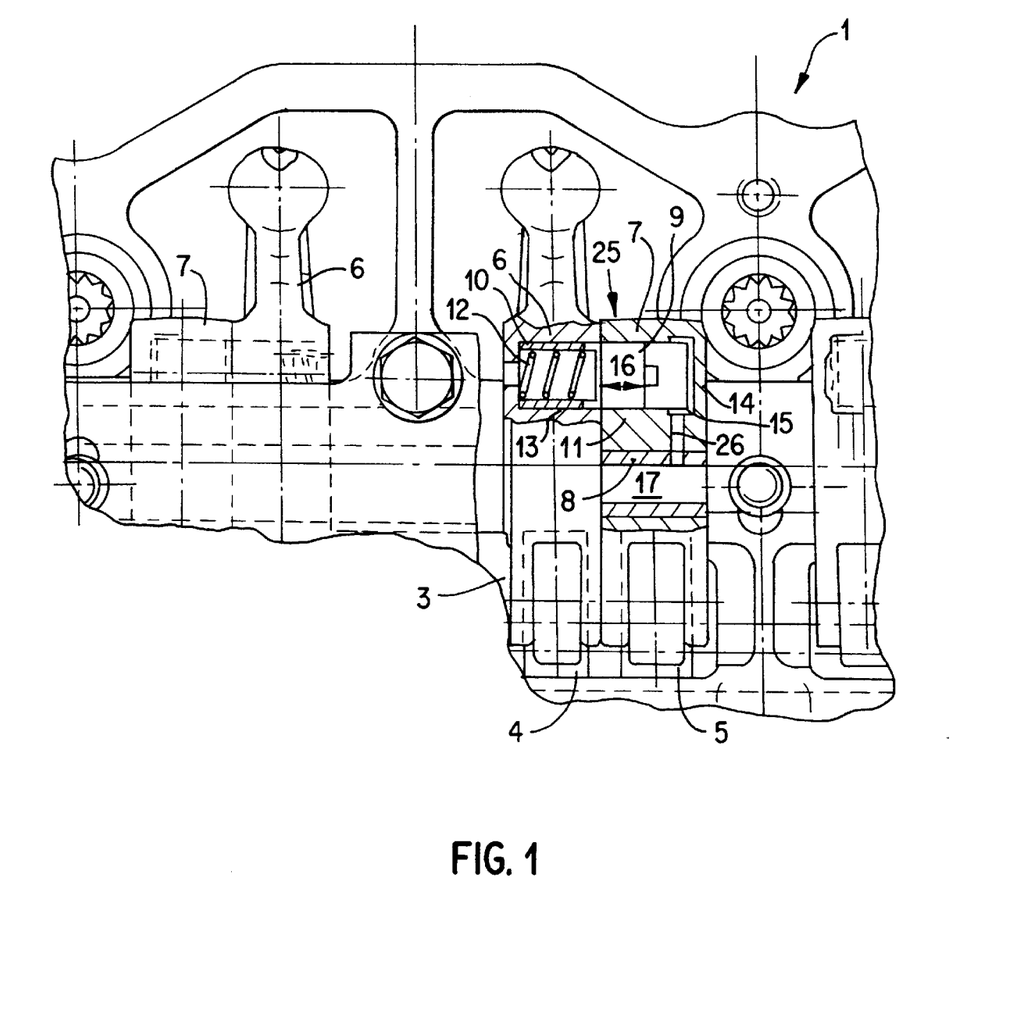
FIG. 1 shows a multicylinder internal combustion engine with a device for cylinder shutdown, partially in section.
Figure 2:
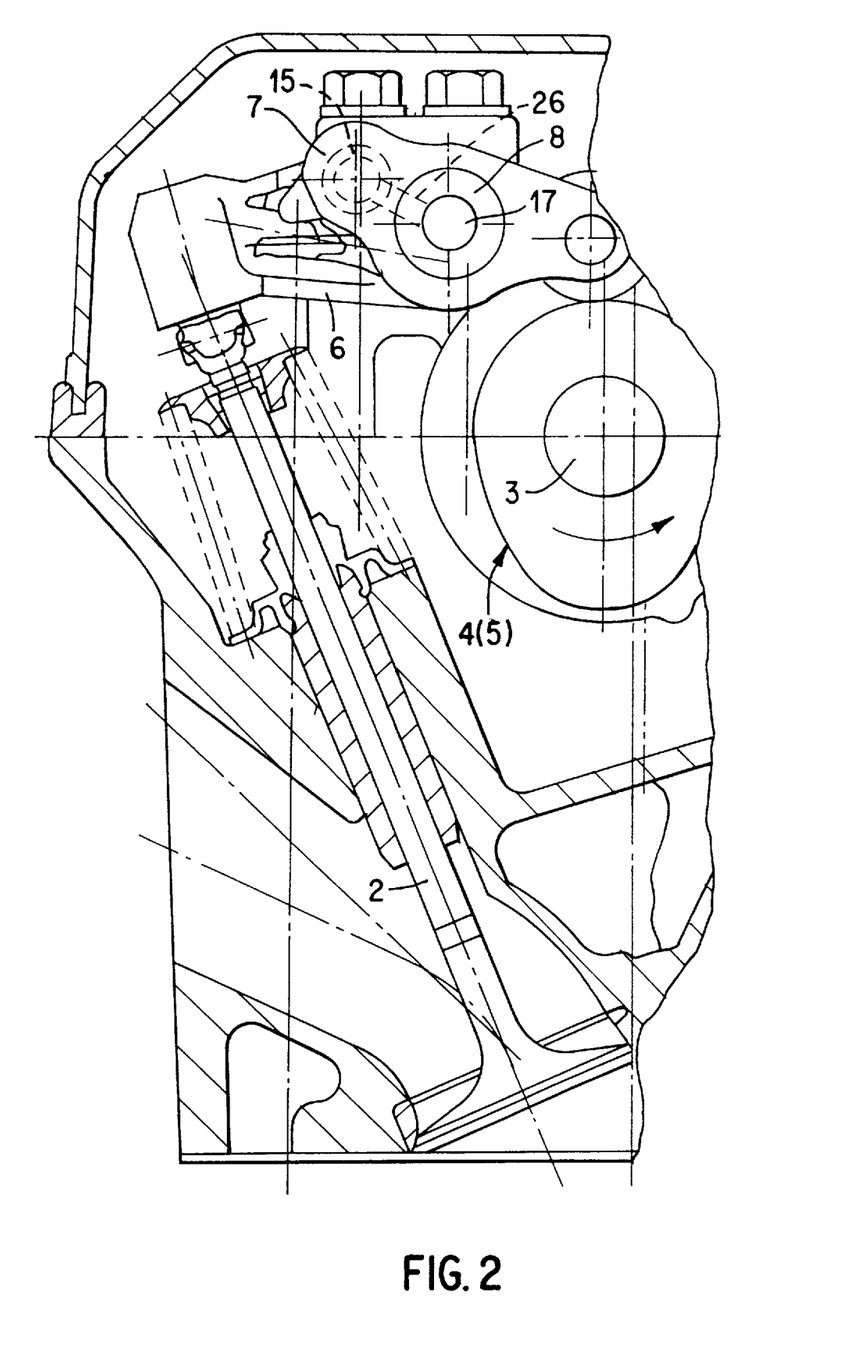
FIG. 2 shows the multicylinder internal combustion engine in FIG. 1, in cross section.
Figure 3:
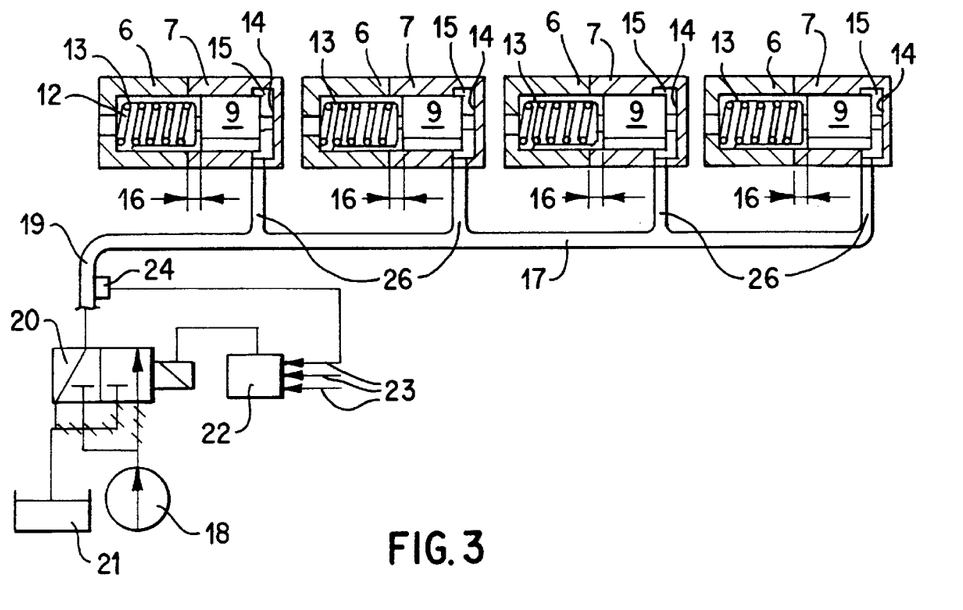
FIG. 3 is a schematic diagram of a shutdown device for four charge change valves.

At least one intake or exhaust valve 2 (FIG. 2) per cylinder is provided in cylinder head 1 of a multicylinder internal combustion engine according to FIGS. 1–3, and is driven by a camshaft 3. Although the device is described below with reference to an intake valve 2, it can also be used for exhaust valves. Two cams 4, 5 are provided on camshaft 3 for each intake valve 2. One cam 4 supports an actuating lever 6 designed as a rocker arm driving the intake valve directly, while the other cam 5 actuates a coupling lever 7 that is couplable with actuating lever 6. Actuating lever 6 and coupling lever 7 are rotatably mounted on a common lever axis 8. The two cams 4, 5 have base circles with the same diameter, while only cam 5 associated with coupling lever 7 has a cam lobe. In the uncoupled state, the base circle of cam 4 is operative, so that intake valve 2 remains in the closed state. In the coupled state of the two levers 6, 7, the cam lobe of cam 5 is operative, and actuates intake valve 2. The valve lift curve is thus determined exclusively by cam 5.

The coupling of actuating lever 6 and coupling lever 7 is performed by a coupling device 25 that comprises a pin 9, a guide cup 13, a cylindrical hole 10, and a bore 11 as coupling elements. Pin 9 is displaceable lengthwise, in a bore 11 in coupling lever 7 that is parallel to lever axis 8 and is tensioned by a spring 12 in a guide cup 13, which is also displaceable lengthwise, in cylindrical hole 10 in actuating lever 13. Levers 6, 7 and cams 4, 5 are arranged so that cylindrical hole 10 is flush with bore 11 when the two levers 6, 7 rest on the respective base circles of cams 4 and 5. In the coupled state, spring 12 urges guide cup 13 and pin 9 against a stop 14 on the side away from actuating lever 6. In this position, guide cup 13 has a part of its length 16 extending into bore 11, so that the two levers 6 and 7 are non-rotatably coupled to one another. To decouple the two levers 6,7 an oil pressure is generated in a pressure chamber 15 on the side of pin 9 away from actuating lever 6, said pressure urging said pin against the force of spring 12 against the stop of guide cup 13 at the end wall of cylindrical hole 10, so that it stops at the contact plane between the two levers 6, 7 and does not project into bore 11.

Guide cup 13 can be pushed into bore 11 only during the time that the base circle of cam 5 is operative, since the bore and cylindrical hole 10 are not flush with one another while the cam lobe of cam 5 is operative. Since considerable forces are transmitted between levers 6 and 7 during this operative period of cam lobe, displacement of guide cup 13 inside bore 11 during the operative period of the cam lobe is ruled out even when the coupling or decoupling process has already been initiated by a pressure buildup or pressure drop in pressure chamber 15. In order to avoid damaging guide cup 13, it should therefore already be enclosed to a sufficient degree in bore 11 when the cam lobe becomes operative.

The pressure buildup and drop in pressure chamber 15 is produced through a lengthwise bore 17 in lever axis 8 connected with pressure chamber 15 by a cross line 26 in coupling lever 7. Lengthwise bore 17 is supplied with oil through a line 19 by an oil pump 18 that can be the conventional lubricating oil pump of the internal combustion engine. As shown in FIG. 3, a 3/2-way valve 20 is provided in this line 19, said valve linking lengthwise bore 17 either with oil pump 18 or with a reservoir 21. The 3/2-way valve 20 is switched by an electrical signal from a control device 22, which receives as input signals 23 in particular the engine rpm n, a position signal $N_{seg}$ from the crankshaft or camshaft, as well as the oil temperature $T_{oil}$ through a temperature sensor 24 in line 19. The 3/2-way valve 20 can be controlled in very specific camshaft positions with the aid of control device 22. The 3/2-way valve 20 switches quickly and has a switching time invariancy that is as small as possible. In addition, the time delay between the switching of 3/2-way valve 20 and pin 9 is reduced by using line cross sections that are as large as possible and line lengths that are as short as possible.

The device described above for shutdown cylinders is only one possible embodiment. Of course, other devices can be used. The critical aspect however is that control of the switching process proceeds quickly and without any fluctuations in time. It is only in such cases that the switching process can be performed on the basis of the current engine rpm n at a camshaft angle that is preset as exactly as possible.

Figure 4A:
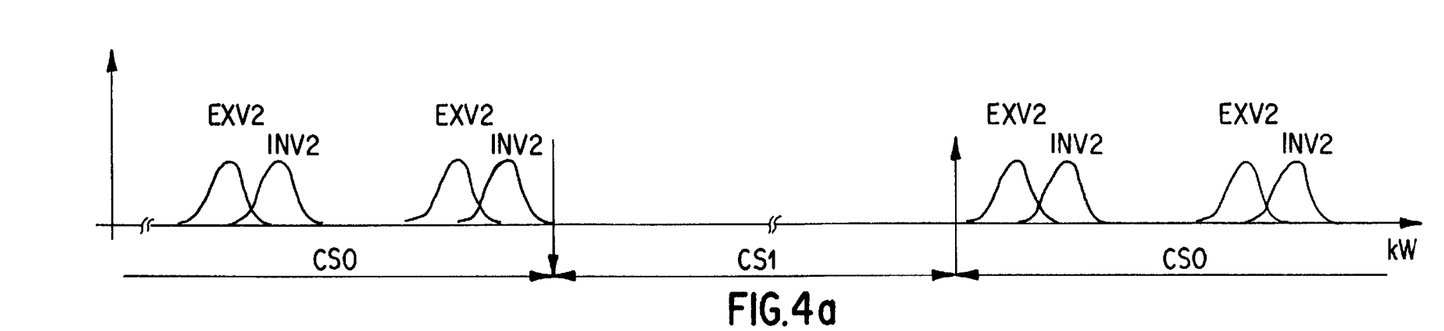
FIG. 4 is a schematic diagram of the valve lift curves of the charge change valves of a cylinder before, during, and after a cylinder shutdown.
Figure 4B:
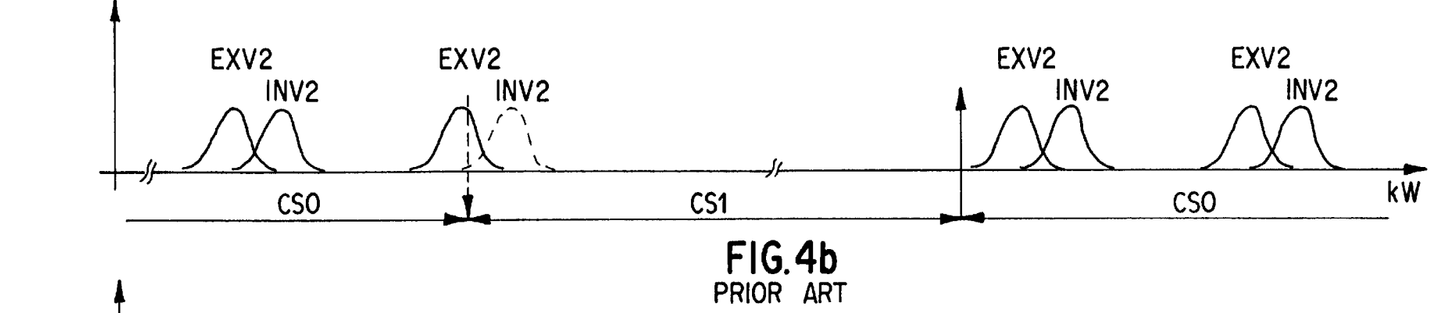
Figure 4C:
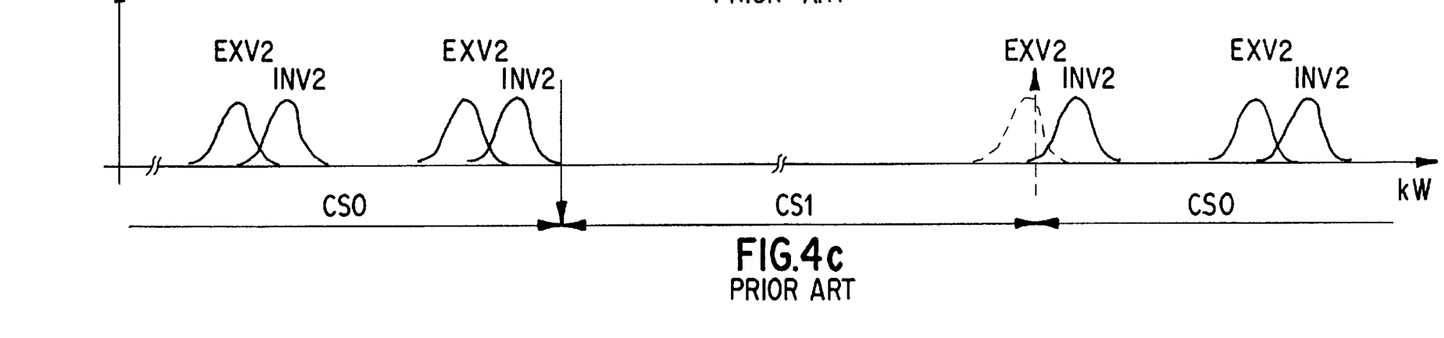

FIG. 4a shows the valve lift curves of the intake valve (INV2) and the exhaust valve (EXV2) for cylinder C2 as an example, shown schematically before, during, and after a cylinder shutdown when the method according to the invention is implemented. FIGS. 4b) and c), which are included for comparison, show similar curves without using the method according to the invention. (Crankshaft angle CA is plotted on the abscissa and the valve lift curve is plotted on the ordinate.) During one operating cycle of the internal combustion engine when the cylinder is not shut down, intake valve INV2 opens and exhaust valve EXV2 opens, once each. The crankshaft ranges in which the cylinder shutdown process is not activated are labeled CSD0 and the area in which the cylinder is shutdown is labeled CSD1. The downward-pointing arrow marks the commencement of a cylinder shutdown and the arrow directed upward indicates the restarting of the cylinder. To make it clear that any number of operating cycles can take place between the cylinder being shut down and restarted, the angle axis is interrupted in the vicinity of cylinder disconnection CSD1.

FIG. 4a shows an embodiment according to the invention in which cylinder shutdown or restart is performed according to the invention at a predetermined point in time or at a predetermined crankshaft angle. The cylinder shutdown according to the invention always takes place after one intake cycle INV2. As a result, hot exhaust is located in the shut down cylinder C2 during disconnection phase CSD1 and undesired cooling off of the combustion chamber is avoided. Immediately prior to the shutdown, a fuel/air mixture that is capable of igniting is conducted into cylinder C2 and then burnt there correctly. Only the next exhaust cycle EXV2 is suppressed. After an arbitrary number of skipped operating cycles, the cylinder shutdown is reversed prior to the beginning of an exhaust cycle EXV2. As a result, the exhaust is expelled into the exhaust line and fresh gas capable of igniting is then drawn in again.

To maintain correct combustion, therefore, it is important that the switching processes take place at predetermined points in time or at certain crankshaft angles. In cylinder switching without corresponding timing, an incorrect combustion process will occur statistically after a certain number of switching processes. Two scenarios like those shown in FIGS. 4b and 4c are then possible. Firstly, the disconnection process can take place at a point in time at which exhaust valve ALV2 has already opened so that the burnt exhaust has already been expelled, but intake valve INV2 is still closed. A point in time such as this is labeled in FIG. 4b with a dashed arrow pointing downward. In this case, no hot exhaust is in the combustion chamber during disconnection phase CSD1, so that intensified cooling of the combustion chamber takes place and a high vacuum also prevails in the combustion chamber.

The second undesirable scenario can occur during the cylinder connection process and is labeled accordingly in FIG. 4c by a dashed arrow pointing upward. In this situation, cylinder connection takes place at a point in time immediately before an intake cycle, with the previous exhaust cycle having been suppressed. If the cylinder disconnection process takes place correctly after one intake cycle, at the point in time of the first intake cycle there will still be burnt exhaust in the combustion chamber. During the first intake cycle the fresh gas mixes with the exhaust in the combustion chamber, so that a gas mixture that burns poorly (or cannot ignite at all) may result. The result is a deterioration of the exhaust behavior of the internal combustion engine. In order reliably to prevent such undesired scenarios, appropriate timing of the shutdown and restart process is essential.

In the following, with reference to FIG. 5 which shows schematically the valve control times for a V8 engine, a method according to the invention will be described in detail with reference to a shutdown process. The cylinders are divided into two banks, with cylinders C1–C4, shown above the dashed line in FIG. 5, being arranged in bank 1 and cylinders C5–C8, shown below the dashed line, being located in bank 2. The time axis or crankshaft angle CA is plotted on the abscissa, with the crankshaft segments $N_{seg}$, also plotted on the first line, being picked up by a segment transmitter sensor, mounted directly on crankshaft 3 for example. On the uppermost line, for improved understanding, the timing sequence/ignition sequence of the individual cylinders C1–C8 is also plotted. On the lines below, the valve control times INV1–INV8, EXV1–EXV8 of the individual intake and exhaust valves 2 are shown, with the valve control times of the deactivated valves 2 being shown for improved understanding, but shaded.

According to this embodiment, during cylinder shutdown, half of cylinders C1–C8 are shut down, namely cylinders C2 and C3 in bank 1 and cylinders C5 and C8 in bank 2. Corresponding shutdown devices are provided for this purpose on cylinders C2, C3, C5, C8 to be shut down, but not on the other cylinders C1, C4, C6, and C7. Although only internal combustion engines with one intake valve or exhaust valve 2 per cylinder are shown in the embodiments, the method according to the invention also applies to internal combustion engines with a plurality of intake and/or exhaust valves per cylinder. In such cases, it is merely necessary to equip all the valves of the cylinders to be shut down with a corresponding shutdown device. According to the embodiment, all of the valves EXV2, INV2, EXV3, INV3 to be switched in bank 1 are actuated by a first shutdown device shown in FIG. 3 and designated by 27a as a whole, while a second shutdown device 27b is provided for valves EXV8, INV8, EXV5, and INV5 to be switched in bank 2.

Figure 5:
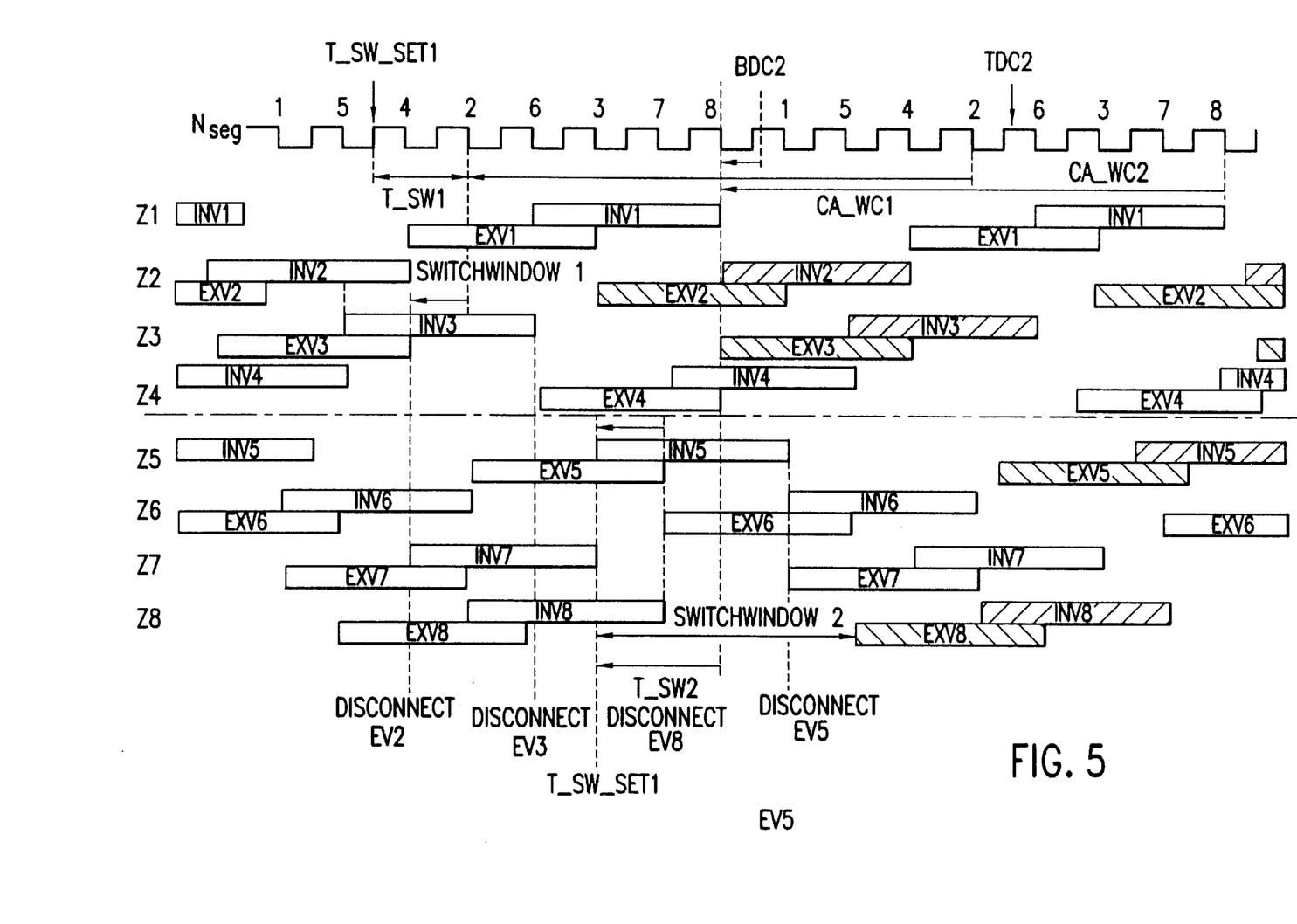
FIG. 5 is a schematic view showing the shutdown timing with reference to the valve control times for a V8 engine.

The cylinder shutdown process according to FIG. 5 is intended to begin with the second cylinder C2 in bank 1. Then the other cylinders are deactivated in the sequence C3, C8, and C5, with the exhaust valve being disconnected first on each of cylinders C2, C3, C8, and C5. To ensure that the disconnection process begins with exhaust valve 2 of cylinder C2, disconnection device 27a must be switched somewhere within the crankshaft angle range marked by switching window 1, which extends over the crankshaft range between the beginning of intake at valve INV3 and the beginning of exhaust at valve EXV2. When the switching process begins, line 19 is connected with oil pump 18 by 3/2-way valve 20 in shutdown device 27a. As a result, the oil pressure rises simultaneously in pressure chambers 15 of all the coupling devices 25 of valves EXV2, INV2 of cylinder C2 and EXV3, INV3 of cylinder C3. However, only those valves 2 can enter the coupling position whose coupling levers 7 abut the base circle of cam 5 at the current point in time, since pin 9 can move out of bore 11 only at this time. As long as the corresponding valve is held in the open position by corresponding cam 5, guide cup 13 is not free of forces and decoupling can therefore not take place.

If the switching process were to begin ahead of the above range, intake valve INV3 on cylinder C3 would be the first to be deactivated. In this case, valve INV3 would still be in the closed position and thus the shutdown process could begin immediately when shutdown device 27a was activated. If the shutdown process on the other hand were not to be started until after switching window 1 had passed, exhaust valve EXV2 would already be at least partially open and the shutdown process could no longer be performed successfully. Intake valve INV2 would still be in the closed position in this state and thus could be successfully deactivated. Thus, exhaust valve EXV2 would still go through one complete exhaust cycle, while the following intake cycle INV2 would be suppressed. This would mean however that the switching of cylinder C2 would take place not after one intake cycle but after one exhaust cycle.

This choice of switching window 1 has the following effect on the cylinder shutdown process. In cylinder C2, at the beginning of switching window 1, the previous exhaust cycle EXV2 would be completed in any event and upon activation of disconnection device 27a the decoupling process could start immediately. Intake cycle INV2 is either already complete or coupling device 25 on intake valve 2 is held in the coupling position despite the activation of shutdown device 27a by a positive connection until intake cycle INV2 is complete. Thus assurance is provided for cylinder C2 that the cylinder shutdown process takes place after one intake cycle in any event. In cylinder C3, both exhaust cycle EXV3 and intake cycle INV3 have already begun at the start of switching window 1, so that both operating cycles are completely performed because of the positive connection in coupling devices 25. As a result, the operating cycle of charge change valves 2 in cylinder Z3 terminates with an intake cycle before the cylinder is shut down.

The opening times of the valves on cylinders Z1 and Z4 can be left out of consideration in this regard since no coupling devices 25 are provided on them. The same is true of cylinders C6 and C7 in bank 2. In this case, only the opening times of the valves on cylinders C5 and C8 must be taken into account, since only these valves are provided with a coupling device 25. The remarks regarding the choice of the corresponding switching window 2 are the same as above. In this case, switching window 2 begins after the start of intake at intake valve INV5 and ends before the beginning of exhaust at exhaust valve EXV8.

For safety reasons, the middle of switching window 1 or 2 is selected as the point in time at which shutdown is to take place. This ensures firstly that valve INV3 or INV5 is already wide open and thus can reliably not be shut down, and secondly that the shutdown of valve EXV2 or EXV8 is reliably ended before the beginning of exhaust. In controlling 3/2-way valve 20 however, additional consideration must be given to the fact that the system, by virtue of its mechanical and hydraulic inertia, requires a certain switching time—that is, the time between 3/2-way valve 20 being controlled and the potential switching process at coupling devices 25. These switching times StC1 and StC2 are added together from an offset St Cos that depends on the rpm and oil temperature and a directionally dependent valve switching time St off, St on. "Directionally dependent" in this context means that the switching times for cylinder shutdown St off and cylinder restart St on are different. These switching times can be read for example from a corresponding characteristic.

The beginning of the last camshaft segment $N_{seg}$ before the first switching cylinder reaches Top of Dead Center (TDC) is selected as a reference mark for switching timing in each case. For bank 1 for example the TDC is entered for cylinder C2, with the reference mark in this case corresponding to the end of the camshaft segment $N_{seg}$ marked 2. Starting at this reference mark, the angle range ASFM1, ASFM2 is determined up to the middle of the corresponding switching window 1, 2. When a signal from the motor control is applied for cylinder disconnection, initially the corresponding switching times StC1, StC2 are added to the current crankshaft angle and then the corresponding angle ranges AsFM1 and AsFM2. Starting at this point in time, the next possible reference mark is determined and calculated backward by subtracting the angle range WSFM1, WSFM2 and the switching time StC1, StC2 of the desired switching time Tswset1, Tswset2. At this point in time, the cylinder shutdown process is activated by switching 3/2-way valve 20.

The position of the switching window relative to the overlapping TDC of cylinder C2 in bank 1 or cylinder C8 in bank 2 is determined by the formula:

center of switching window=-½(-Ab+EB)-360° KW where EB=beginning of intake (amount) in °CA [crankshaft angle] before TDC with 0 mm valve lift;

AB=beginning of exhaust (amount) in °CA before BDC with 0 mm valve lift, with a positive sign corresponding to a crankshaft angle before the respective overlapping TDC and a negative sign corresponding to a negative crankshaft angle before the respective overlapping TDC in the formula.

Figure 6:
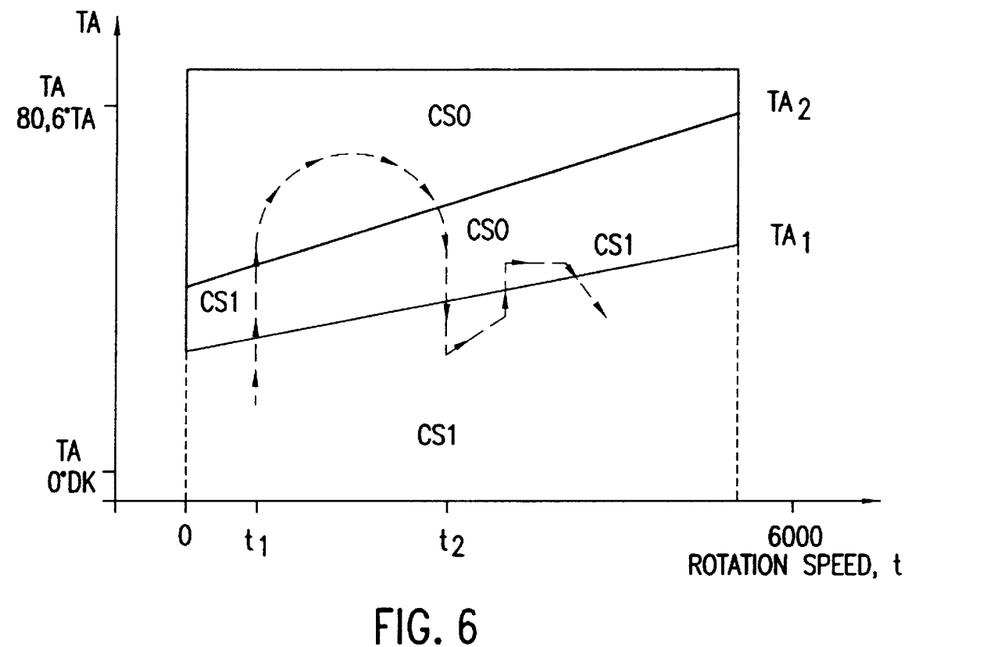
FIG. 6 is an embodiment showing the shutdown and restart curves for the cylinder shutdown.

However, cylinder shutdown theoretically can take place only when various preset restart conditions have been met. For this purpose, various engine parameters, for example engine/oil temperature, oil pressure, rpm, time since the starting of the engine or since the last cylinder shutdown, engaged speed, and ambient pressure are compared with predetermined threshold values or admissible value ranges. A cylinder shutdown process is permitted only if some or all of these restart conditions have been met. In particular, the rpm conditions can be provided to suppress undesired shifting processes with a hysteresis rpm as shown in FIG. 6. For this purpose, two curves TA1, TA2 are provided for throttle angle TA as a function of rpm n. In the range CS1 below characteristic TA1, cylinder shutdown can always be activated and in the range CS0 above characteristic TA2 it can never be activated. The switch from CS0 to CS1 however takes place only with a drop below characteristic TA1. The switch from CS1 to CS0 accordingly takes place only when characteristic TA2 is exceeded. In the range between the two characteristics WDK1 and WDK2, therefore, no switching can take place. If, as shown in the right half of FIG. 6, the throttle angle WDK exceeds characteristic TA1 only slightly, and only for a short time at that, deactivation of cylinder shutdown is suppressed. If throttle angle TA exceeds characteristic TA2 during a spontaneous load demand, cylinder shutdown is deactivated.

During the operation of the internal combustion engine, cylinder shutdown is therefore activated only if the restart conditions have been met and if characteristic WDK1 has been undershot. At this point in time, determination of switching time Tswset1, Tswset2 is triggered. When this switching time Tswset1, Tswset2 is reached, the shutdown process is triggered by controlling 3/2-way valve 20. Fuel injection is controlled so that prior to each correct intake stroke, injection takes place into the corresponding cylinder while when the intake valve is deactivated, injection is always prevented. This means that there is neither any fuel injection into a cylinder that has been shut down nor are there operating cycles in which only air is conducted into the combustion chamber. In order to ensure that this is so, corresponding control signals are passed from the cylinder shutdown system to the control device for fuel injection.

In order to take into account both exhaust quality and driving comfort, as well as fuel consumption when the cylinders are shut down, additional corrections can be provided that apply to throttle position, fuel metering, and ignition timing. As far as throttle position is concerned, the change in torque caused by the disconnection of cylinders should be compensated by correction. For example, if cylinder shutdown is initiated during constant acceleration (in other words with the accelerator at a constant position), the output power of the engine would change if the throttle angle were not corrected. The corresponding reverse effect can also be seen during a cylinder restart process. To avoid this problem, a switch is made from the current throttle setpoint WDK_ZAS0 with deactivated cylinder shutdown, to a corrected throttle setpoint WDK-ZAS1 with activated cylinder shutdown. The switch can be made by the addition of a switching characteristic whose values are set as a function of rpm n and the uncorrected throttle setpoint TA-CS0, to throttle setpoint TA-CS0.

In addition to this steady-state value for torque equalization before or after a switching process, a dynamic correction can also be performed for more rapid adaptation of the intake manifold pressure. In order to adjust the intake manifold pressure more rapidly to the new setpoint during a spontaneous setpoint change, an excessive setpoint change is performed for a short period of time.

Figure 7:
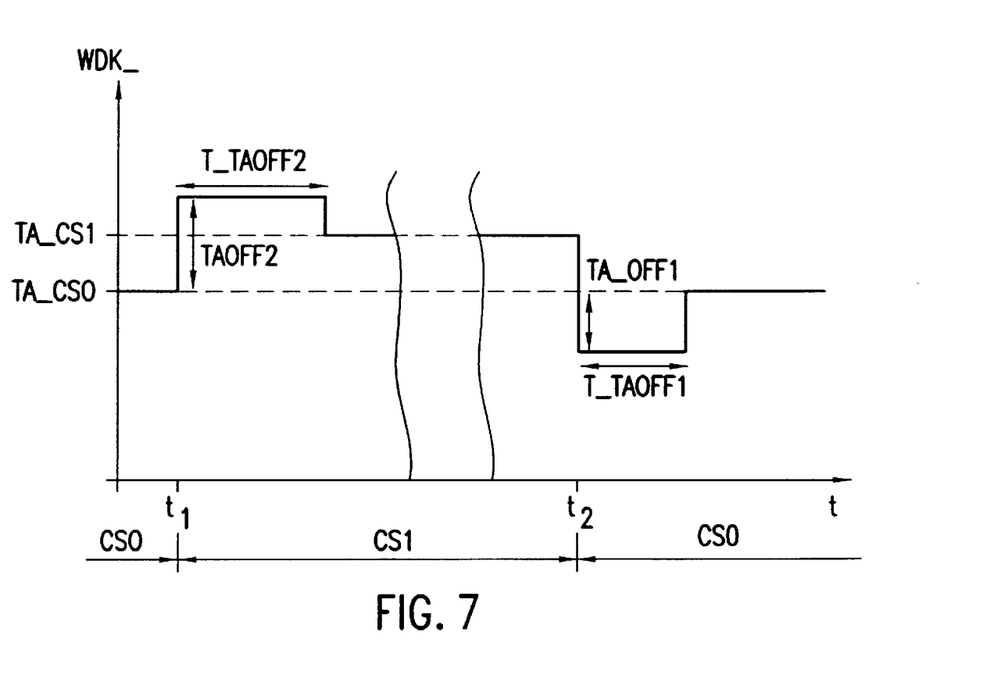
FIG. 7 is a schematic view showing a correction of the throttle angle with reference to a cylinder switching process.

In FIG. 7, the desired throttle setpoints TA-des are plotted for a steady state as a function of the time before, during, and after a cylinder shutdown. Starting with a state CS0 without cylinder shutdown, the throttle is regulated to a setpoint TA-CS0. If a cylinder shutdown is then started at a point in time $t_1$ by dropping below characteristic TA1, an offset TAoff2 is added to throttle setpoint TA-CS0 for an applicable time T-TAoff2. After the period of time T-TAoff2 has elapsed, a switch is then made for the entire duration of the cylinder shutdown to the corrected setpoint TA-CS1. When the cylinder shutdown process is then deactivated once again, starting at a point in time t2, by dropping below characteristic TA2, an offset DKOF2 is subtracted from throttle setpoint TA-CS0 for an applicable time T-TAoff1. After this period of time T-TAoff1 has elapsed, a switch is then made back again to the original setpoint TA-CS0. The applicable intervals T-TAoff1, T-TAoff2 and the offset values for the throttle setpoint TA-des can be set as a function of rpm n. The difference between setpoints TA-CS0 and TA-CS1 therefore serves for steady-state torque equalization, while offset TAoff1 or TAoff2 results in a more rapid emptying of the intake manifold or a filling thereof.

In addition to correcting the air volume, an ignition angle correction can also be performed to prevent a sudden change in torque. Especially when restarting the cylinders, engine torque can be reduced by a deliberate deterioration of the ignition angle for a predetermined period of time. Ignition angle correction has the advantage that it influences engine torque more rapidly by comparison with air volume correction, in which there is a certain dead time between an angle change at the throttle and the airflow to be adjusted at the cylinder. By means of an additional correction, the fuel volume can then be adjusted during the switching process so that the wall film effects in the cylinders to be shut down and the corresponding intake manifold can be taken into account. During cylinder restart a temperature-dependent wall film surcharge is determined and added to the injection volume of the first injection process. Accordingly, the last injection process can be corrected before the cylinder is shut down.

Figure 8:
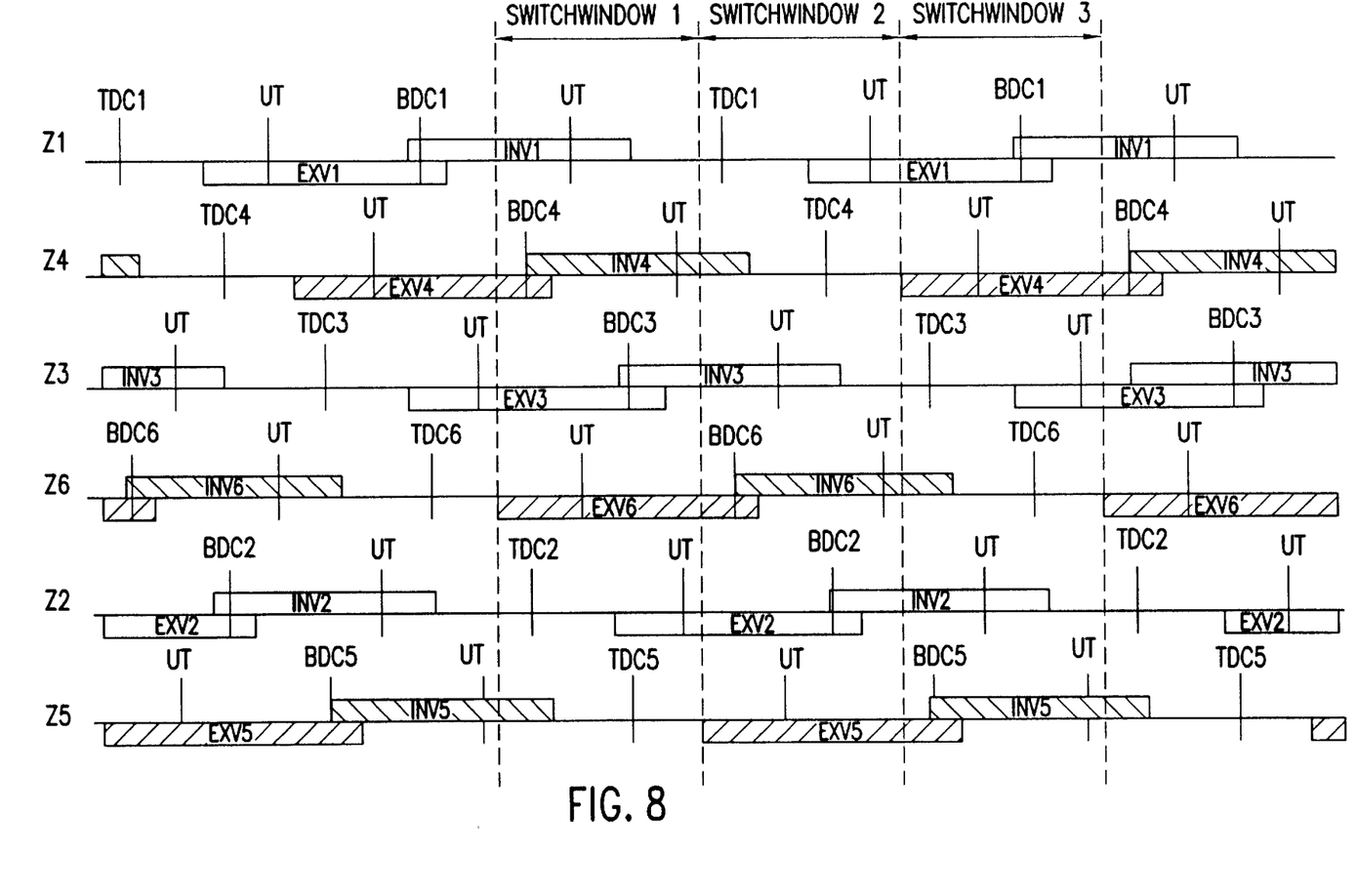
FIG. 8 is a schematic diagram showing the shutdown timing with reference to the valve control times for a 6-cylinder engine.

Another embodiment of a method for cylinder shutdown according to the invention will now be described in greater detail with reference to FIG. 8, which figure shows the valve control times of a 6-cylinder engine. The valve control times of cylinders C4, C6, and C5 to be shut down are cross hatched. In this embodiment, all of the intake valves of cylinders C4–C6 to be switched are provided with a first shutdown device 27a and all the outlet valves are provided with a second shutdown device 27b. With this scenario, it is possible, by an appropriate choice of switching windows, to establish the sequence of cylinders to be switched. In FIG. 8 the three switching windows 1–3 are plotted for switching the exhaust valves. If the switch takes place in switching window 1, the cylinder shutdown process takes place in the sequence C5-C4-C6. This is because at the beginning of switching window 1 the exhaust valves on cylinders C4 and C6 are still open or arc already open and therefore cannot get out of the coupling position because of the positive connection at pin 13. Therefore exhaust valve EXV5 is the first exhaust valve that can get out of the coupling state. In the two other switching windows 2–3 the sequence of the cylinders is changed cyclically, with the exhaust valves being deactivated in the sequence EXV4-EXV6-EXV5 during a switching process in switching window 2 and in the sequence EXV6-EXV5-EXV4 in switching window 3. By analogy with the first embodiment, the switching process takes place once again at the middle of the respective switching window. The timing for controlling 3/2-way valve 20 also corresponds to that described above.

Corresponding switching windows can be determined for the intake valves, but they have not been plotted in FIG. 8 for the sake of clarity. The position of the switching windows based on the overlapping TDC of the first switching cylinder is determined according to the formulas:

switching window-middle intake=$-EB-120°$ KW switching window-middle exhaust=$-AB-300°$ KW where EB=beginning of intake (amount) in °CA before TDC with 0 mm valve lift;

AB=beginning of exhaust (amount) in °CA before BDC with 0 mm valve lift, with a positive sign in the formula corresponding to a crank angle after the overlapping TDC and a negative sign corresponding to a crankshaft angle before the overlapping TDC.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for shutting down and starting individual cylinders of a multicylinder internal combustion engine having at least one intake valve and at least one exhaust valve per cylinder, and a device for fuel injection for individual cylinders, with said valves of a selected individual cylinder being deactivated or activated during a shutdown or restart of said selected cylinder by means of a shutdown device, and the fuel injection in said selected cylinder being deactivated or activated as a function of an operating state of said valves, the improvement comprising:

when said selected cylinder is switched, a time sequence for activation or deactivation of intake and exhaust valves is controlled such that a shutdown of said selected cylinder takes place after one intake cycle and prior to a next succeeding exhaust cycle thereof, and a restart of said selected cylinder takes place before one exhaust cycle and after a next preceding intake cycle thereof;

a crankshaft angle is preset for said shutdown device relative to a reference mark on a crankshaft or camshaft of said engine on which the switching process is to begin;

an angular switching position of said disconnection device is determined as a function of operating parameters;

when a switching signal is present, the angular switching position and the crankshaft angle are added to a current crankshaft angle;

a next succeeding reference mark is determined on the basis of said crankshaft angle, and angular switching position for the disconnection device is calculated by substracting the crankshaft angle and angular switching position; and when an angular switching position is reached, said disconnection device is activated.

2. Method according to claim 1, wherein:

intake and exhaust valves of at least one cylinder of the multicylinder internal combustion engine each have a coupling device that can be switched only outside preset valve lift curves, and are actuated by a common disconnection device; and when a switching signal is present, said disconnection device is activated at a point in time at which all intake valves to be switched have at least begun a respective intake cycle of a previous operating cycle relative to a first cylinder to be switched, ensuring that a coupling process at an exhaust value of the first cylinder to be switched is completed before an exhaust cycle of said first cylinder begins.

3. Method according to claim 1, wherein fuel injection of said selected cylinder is deactivated or activated as a function of a state of cylinder shutdown.

4. Method for shutting down and starting individual cylinders of a multicylinder internal combustion engine having at least one intake valve and at least one exhaust valve per cylinder, and a device for fuel injection for individual cylinders, with said valves of a selected individual cylinder being deactivated or activated during a shutdown or restart of said selected cylinder by means of a shutdown device, and the fuel injection in said selected cylinder being deactivated or activated as a function of an operating state of said valves, the improvement comprising:

when said selected cylinder is switched, a time sequence for activation or deactivation of intake and exhaust valves is controlled such that a shutdown of said selected cylinder takes place after one intake cycle and prior to a next succeeding exhaust cycle thereof, and a restart of said selected cylinder takes place before one exhaust cycle and after a next preceding intake cycle thereof;

intake and exhaust valves of a plurality of cylinders of the multicylinder internal combustion engine each have a coupling device that is switchable only outside preset valve lift curves, and are actuated by a common disconnection device; and when a switching signal is present disconnection devices are activated at a point in time at which all intake and exhaust valves to be switched have at least begun a respective intake or exhaust cycle of a previous operating cycle relative to a first cylinder to be switched, ensuring that a coupling process at an intake or exhaust valve of the first cylinder to be switched is complete before an intake or exhaust cycle of said first cylinder begins.

* * * * *